US008621202B2

(12) United States Patent
Mukherjee

(10) Patent No.: US 8,621,202 B2
(45) Date of Patent: Dec. 31, 2013

(54) EXTERNALLY MANAGED SECURITY AND VALIDATION PROCESSING DEVICE

(75) Inventor: Shrijeet Mukherjee, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 650 days.

(21) Appl. No.: 12/704,007

(22) Filed: Feb. 11, 2010

(65) Prior Publication Data

US 2011/0197060 A1 Aug. 11, 2011

(51) Int. Cl.
*H04K 1/00* (2006.01)
(52) U.S. Cl.
USPC .......................................... 713/155; 713/187
(58) Field of Classification Search
USPC ......................................................... 713/155
See application file for complete search history.

(56) References Cited

U.S. PATENT DOCUMENTS

| 8,108,668 | B2 * | 1/2012 | Rozas | 713/155 |
|---|---|---|---|---|
| 2007/0226786 | A1 | 9/2007 | Berger et al. | |
| 2008/0046581 | A1 * | 2/2008 | Molina et al. | 709/229 |
| 2010/0313011 | A1 * | 12/2010 | Laffey | 713/155 |

OTHER PUBLICATIONS

PCT International Search Report and The Written Opinion of The International Searching Authority for PCT Application PCT/US2011/023759 (which claims priority to U.S. Appl. No. 12/704,007), ISA/US, mailed Apr. 11, 2011 (eight pages).

* cited by examiner

*Primary Examiner* — Kambiz Zand
*Assistant Examiner* — Ghodrat Jamshidi
(74) *Attorney, Agent, or Firm* — The Law Office of Kirk D. Williams

(57) ABSTRACT

An externally managed security and validation processing device includes a cryptographic processing subsystem configured for performing security or validation services; an application interface configured for communicating security or validation services with an application system; and a secure management interface configured for communicating information, including configuration information for the cryptographic processing system for performing said security or validation services, with a service profile system external to the apparatus without passing said configuration information through the application system. The service profile system can typically also migrate security services provided by one apparatus to another apparatus.

22 Claims, 3 Drawing Sheets

EXTERNALLY MANAGED SECURITY AND VALIDATION PROCESSING DEVICE

TECHNICAL FIELD

The present disclosure relates generally to an externally managed security and validation processing device, such as, but not limited to a Trusted Platform Module (TPM).

BACKGROUND

Security and validation services are important in the computing and communications industries, such as for encrypting data and validating that software has not changed, or the user is authorized to use the software. A Trusted Platform Module (TPM) is typically included in a computer sold today to provide such security and validation services. A TPM typically includes specific hardware programmed with private signed keys or digital certificates, and for example, information encrypted with a specific TPM may only be accessible using the same physical TPM.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1:
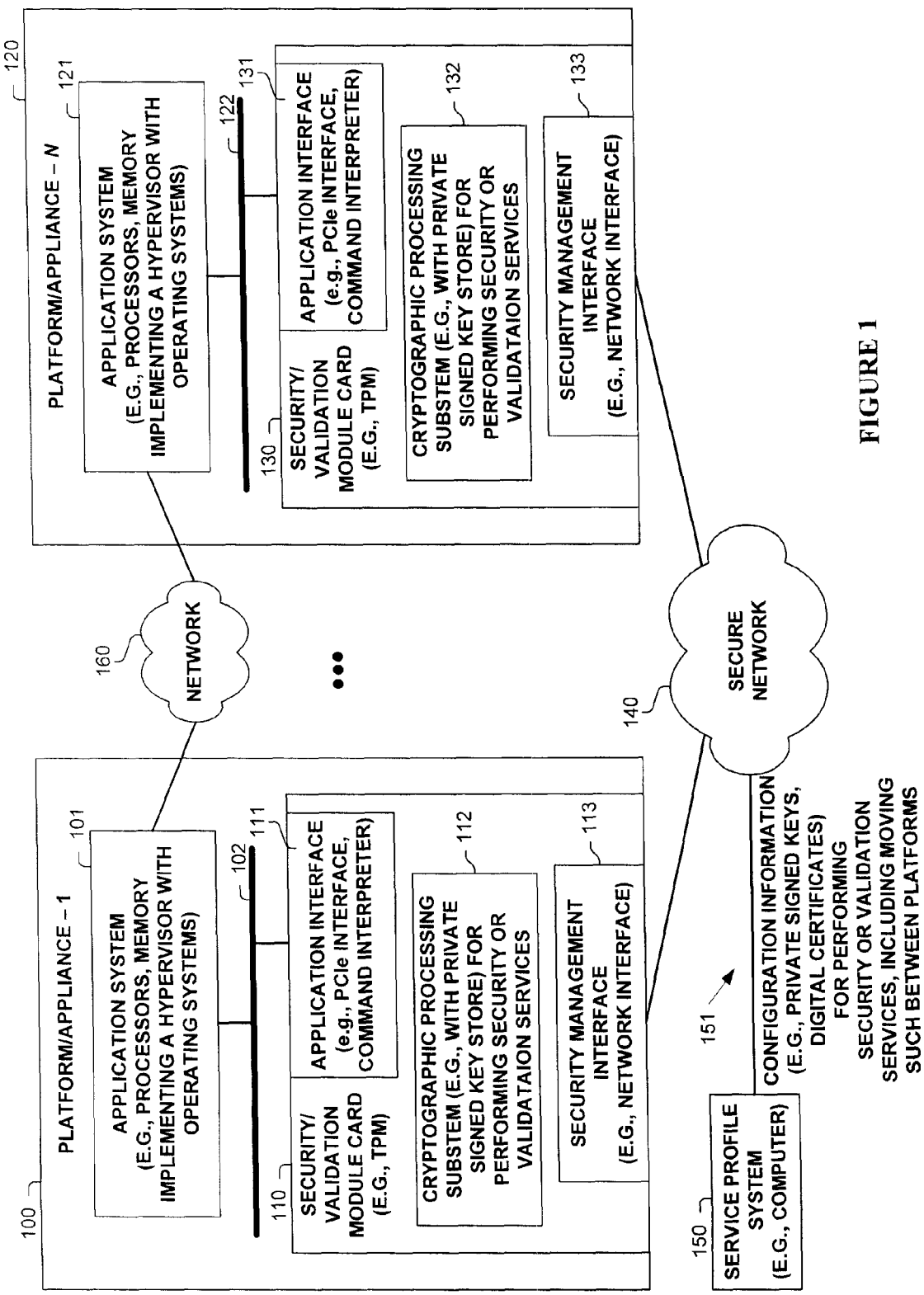
FIG. 1 illustrates multiple security or validation modules of multiple appliances managed by an external service profile system operating in a network according to one embodiment.

Disclosed are, inter alia, methods, apparatus, computer-storage media, mechanisms, and means associated with an externally managed security and validation processing device. One embodiment includes an apparatus, comprising: a cryptographic processing subsystem, including one or more processors and memory, configured for performing security or validation services; an application interface configured for communicating with an application system external to the apparatus, with said communicating including providing said security or validation services to the application system; and a secure management interface configured for communicating information, including configuration information (e.g., providing and withdrawing of credentials) for the cryptographic processing system for performing said security or validation services, with a service profile system external to the apparatus without passing said configuration information through the application system. By providing and withdrawing of credentials associated with the service profile, one embodiment does not have a physical binding to a specific TPM, which may be advantageous in certain computing environments, especially virtual computing environments in which a virtual computer can be moved among different computing systems. As used herein, credentials refer to private signed keys, digital certificates or other authentication configuration information which allows the performance of corresponding said security or validation services when the credentials are provided; and ceases the ability to provide said security or validation services when the credentials are withdrawn.

In one embodiment, the apparatus is a Trusted Platform Module (TPM). In one embodiment, the apparatus is a module card configured for operating inside an appliance including the application system. In one embodiment, the application interface includes an interface of the Peripheral Component Interface (PCI) family. In one embodiment, the secure management interface includes a network interface configured for communicating with the service profile system.

2. Description

Disclosed are, inter alia, methods, apparatus, computer-storage media, mechanisms, and means associated with an externally managed security and validation processing device. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the embodiments. Note, the term "apparatus" is used consistently herein with its common definition of an appliance or device.

Note, the steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Disclosed are, inter alia, methods, apparatus, computer-storage media, mechanisms, and means associated with an externally managed security and validation processing device. One embodiment includes an apparatus, comprising: a cryptographic processing subsystem, including one or more processors and memory, configured for performing security or validation services; an application interface configured for communicating with an application system external to the apparatus, with said communicating including providing said security or validation services to the application system; and a secure management interface configured for communicating information, including configuration information (e.g., providing and withdrawing of credentials) for the cryptographic processing system for performing said security or validation services, with a service profile system external to the apparatus without passing said configuration information through the application system. By providing and withdrawing of credentials associated with the service profile, one embodiment does not have a physical binding to a specific TPM, which may be advantageous in certain computing environments, especially virtual computing environments in which a virtual computer can be moved among different computing systems. As used herein, credentials refer to private signed keys, digital certificates or other authentication configuration information which allows the performance of corresponding said security or validation services when the credentials are provided; and ceases the ability to provide said security or validation services when the credentials are withdrawn.

In one embodiment, the apparatus is a Trusted Platform Module (TPM). In one embodiment, the apparatus is a module card configured for operating inside an appliance including the application system. In one embodiment, the application interface includes an interface of the Peripheral Component Interface (PCI) family. In one embodiment, the secure management interface includes a network interface configured for communicating with the service profile system for receiving said configuration information.

One embodiment includes an apparatus, comprising: an application system, including one or more processing elements and memory; and a Trusted Platform Module. In one embodiment, the Trusted Platform Module includes: a cryptographic processing subsystem, including one or more processors and memory, configured for performing security or validation services; an application interface configured for communicating with the application system, with said communicating including providing said security or validation services to the application system; and a secure management interface configured for communicating information, including configuration information for the cryptographic processing system for performing said security or validation services, with a service profile system external to the apparatus without passing said configuration information through the application system. The application system is configured for using said security or validation services provided by the Trusted Platform Module.

In one embodiment, the application system includes one or more processing elements and memory configured for executing an operating system. In one embodiment, the Trusted Platform Module is a module card within an appliance including the application system. In one embodiment, the apparatus includes a bus; wherein the application interface includes an interface of the Peripheral Component Interface (PCI) family; and wherein the application system and the Trusted Platform Module communicate over the bus. In one embodiment, the secure management interface includes a network interface configured for communicating with the service profile system; and wherein said configuration interface is not communicated over the bus.

In one embodiment, the application system includes computer hardware and software configured for implementing a hypervisor and a plurality of operating systems; and wherein the hypervisor, itself, is configured for using said security or validation services provided by the Trusted Platform Module. In one embodiment, the hypervisor is configured to use said security or validation services to authenticate one or more of the plurality of operating systems. In one embodiment, the hypervisor is configured, in addition to said using said security or validation services provided by the Trusted Platform Module for itself, to provide and to interface said security or validation services provided by the Trusted Platform Module for one or more of the plurality of operating systems.

One embodiment performs a method, comprising: configuring a Trusted Platform Module based on configuration parameters received via a secure management interface integrated in the Trusted Platform Module of an appliance, with the Trusted Platform Module including using one more processing elements and memory; and providing security or validation services over a bus, within the appliance and distinct from the secure management interface, by the Trusted Platform Module to an application system within the appliance, with the application system being implemented using hardware distinct from the Trusted Platform Module; wherein the configuration parameters of the Trusted Platform Module do not traverse the bus nor are accessible by the application system. In one embodiment, the application system implements a hypervisor and one or more operating systems operating on a level above the hypervisor; and wherein the hypervisor uses the security or validation services provided by the Trusted Platform Module, including for its own authentication purposes.

One embodiment includes a networked system, comprising: a service profile system; a first platform, and a second platform. The first platform includes: a first cryptographic system configured for performing security or validation services; and a first application system configured to use the first cryptographic system for performing said security or validation services; wherein the first cryptographic system includes: a first cryptographic processing subsystem, including one or more processors and memory, configured for performing security or validation services; a first application interface configured for communicating with the first application system, with said communicating including providing said security or validation services to the first application system; and a first secure management interface configured for communicating information, including first configuration information for the first cryptographic processing system for performing said security or validation services, with a service profile system external to the first platform without passing said configuration information through the first application system nor the first application interface. The second platform includes: a second cryptographic system configured for performing said security or validation services; and a second application system configured to use the second cryptographic system for performing said security or validation services; wherein the second cryptographic system includes: a second cryptographic processing subsystem, including one or more processors and memory, configured for performing security or validation services; a second application interface configured for communicating with the second application system, with said communicating including providing said security or validation services to the second application system; and a second secure management interface configured for communicating information, including second configuration information for the second cryptographic processing system for performing said security or validation services, with the service profile system external to the second platform without passing said configuration information through the second application system nor the second application interface. The service profile system is configured to provide first configuration information to the first cryptographic system and second configuration information to the second cryptographic system.

In one embodiment, each of the first and the second cryptographic systems include a Trusted Platform Module. In one embodiment, the service profile system is configured to: provide third configuration information to the first cryptographic system for providing said security or validation services; and subsequently to disable the first cryptographic system from providing said security or validation services based on said third configuration information, and to provide said third configuration information to the second cryptographic system for providing said security or validation services. In one embodiment, each of the first and the second cryptographic systems include a Trusted Platform Module.

Expressly turning to the figures, FIG. 1 illustrates an embodiment including N different platforms/appliance 100, 120 ("appliances 100,120"), communicatively coupled via secure network 140 to service profile system 150. Note, the value "N" is used to denote more than one (i.e., 2, 3 . . . ) which may include a very large number of different appliances. Appliances 100, 120 are typically also connected to network 160 (e.g., private network, Internet) for communicating information in a standard manner. In one embodiment, appliances 100, 120 have a network interface coupled to their respective bus (102, 122) (e.g., instead of within application system 101, 121).

In one embodiment, each of appliances 100, 120 is a computer system including a security/validation module card 110, 130, and an application system 101, 121 (e.g., one or more processing elements and memory running an operating system or hypervisor with multiple operating systems). In one embodiment, security/validation module card 110 is a Trusted Platform Module.

As shown, in one embodiment, each of security validation module cards 110, 130 includes an application interface 111, 131 (e.g., a PCIe interface, command interpreter), a cryptographic processing system 112, 132 (e.g., one or more processing elements and memory configured for performing security or validation services), and a security management interface 113, 133 configured for communicating with service profile system for receiving instructions and configuration information (151) (e.g., private signed keys, digital certificates) for performing the security or validation services.

Figure 2:
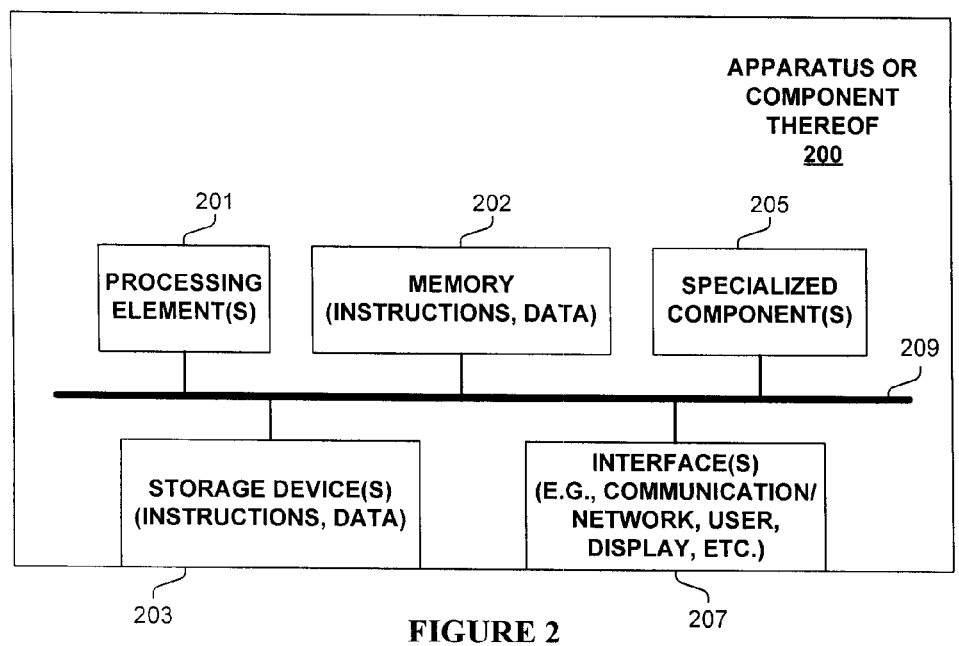
FIG. 2 illustrates an apparatus or component used in one embodiment.

FIG. 2 is block diagram of an apparatus or component 200 used in one embodiment associated with an externally managed security and validation processing device. In one embodiment, system or component 200 performs one or more processes corresponding to one of the flow diagrams illustrated or otherwise described herein.

In one embodiment, apparatus or component 200 includes one or more processing elements 201, memory 202, storage device(s) 203, specialized component(s) 205 (e.g. optimized hardware such as for performing operations, etc.), and interface(s) 207 for communicating information (e.g., sending and receiving packets, user-interfaces, displaying information, etc.), which are typically communicatively coupled via one or more communications mechanisms 209, with the communications paths typically tailored to meet the needs of the application. In one embodiment apparatus or component 200 corresponds to, or is part of, network device 101 of FIG. 1.

Various embodiments of apparatus or component 200 may include more or less elements. The operation of apparatus or component 200 is typically controlled by processing element(s) 201 using memory 202 and storage device(s) 203 to perform one or more tasks or processes. Memory 202 is one type of computer-readable/computer-storage medium, and typically comprises random access memory (RAM), read only memory (ROM), flash memory, integrated circuits, and/or other memory components. Memory 202 typically stores computer-executable instructions to be executed by processing element(s) 201 and/or data which is manipulated by processing element(s) 201 for implementing functionality in accordance with an embodiment. Storage device(s) 203 are another type of computer-readable medium, and typically comprise solid state storage media, disk drives, diskettes, networked services, tape drives, and other storage devices. Storage device(s) 203 typically store computer-executable instructions to be executed by processing element(s) 201 and/or data which is manipulated by processing element(s) 201 for implementing functionality in accordance with an embodiment.

Figure 3:
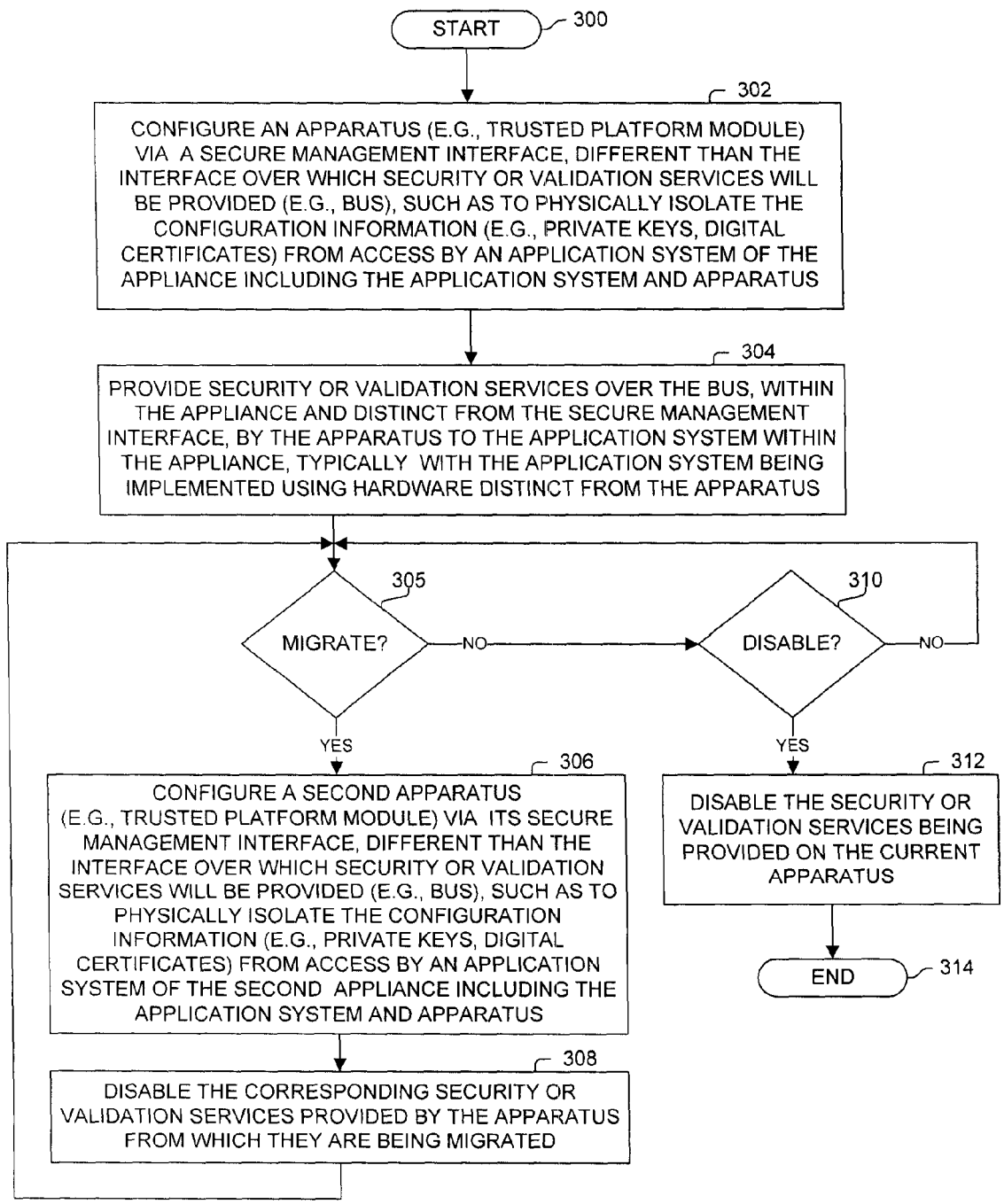
FIG. 3 illustrates a process performed in one embodiment.

Illustrated in FIG. 3 is a process performed in one embodiment. Processing begins with process block 300. In process block 302, an apparatus (e.g., Trusted Platform Module or other module card) is configured via a secure management interface of the apparatus by a service profile system. Note, this secure management interface is different than the interface over which the security or validation services will be provided (e.g., over a bus) to the application system. This architecture physically isolates the configuration information (e.g., private keys, digital certificates) from access by an application system of the appliance (which includes the application system and the apparatus for providing the security or validation services). Further, the application system is typically implemented in hardware which is distinct from the apparatus (e.g., TPM, security or validation module card, etc.).

Next, in process block 304, security or validation services are provided to the application system, over the bus, within the appliance and distinct from the secure management interface, by the apparatus to the application system within the appliance, typically with the application system being implemented using hardware distinct from the apparatus.

As determined in process block 305, when the security or validation services should be migrated from one appliance/ platform to another, then process block 306, the second apparatus (e.g., Trusted Platform Module) of the second appliance is configured with the configuration information (e.g., that provided to the previous apparatus) via its secure management interface, different than the interface over which security or validation services will be provided (e.g., bus), such as to physically isolate the configuration information (e.g., private keys, digital certificates) from access by an application system of the second appliance including the application system and apparatus. In process block 308, the security or validation services are disabled in the previous appliance. Thus, the security or validation services have been migrated from one appliance to another. If the corresponding application system has also been migrated to the second appliance, then the application system can take advantage of the security or validation services even though they are operating on completely different hardware. Thus, for example, a software system that was tied to a particular Trusted Platform Module would function on the new appliance as both the application system and the Trusted Platform Module have been moved.

Otherwise, as determined in process block 310, if the security or validation services provided by the current apparatus should be disabled, the service profile system provides the appropriate commands to the apparatus on its secure management interface.

Processing of the flow diagram of FIG. 3 is complete, as indicated by process block 314.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus, comprising:
a cryptographic processing subsystem, including one or more processors and memory, configured to perform security or validation services;
an application interface configured to communicate with an application system external to the apparatus, with said communicating including providing said security or validation services to the application system; and
a secure management interface configured to communicate information, including configuration information for the cryptographic processing system for performing said security or validation services, with a service profile system external to the apparatus without passing said configuration information through the application system; where said configuration information includes providing and withdrawing of one or more credentials;
wherein the application interface and the secure management interface are two distinct physical interfaces of the apparatus.

2. The apparatus of claim 1, wherein the apparatus is a Trusted Platform Module (TPM).

3. The apparatus of claim 2, wherein the secure management interface includes a network interface configured to communicate with the service profile system for receiving said configuration information.

4. The apparatus of claim 2, wherein the application interface includes an interface of the Peripheral Component Interface (PCI) family.

5. The apparatus of claim 2, wherein the apparatus is a module card configured to operate inside an appliance including the application system.

6. The apparatus of claim 5, wherein the secure management interface includes a network interface configured to communicate with the service profile system for receiving said configuration information.

7. The apparatus of claim 5, wherein the application interface includes an interface of the Peripheral Component Interface (PCI) family.

8. The apparatus of claim 7, wherein the secure management interface includes a network interface configured to communicate with the service profile system for receiving said configuration information.

9. An apparatus, comprising:
an application system, including one or more processing elements and memory; and
a Trusted Platform Module including:
a cryptographic processing subsystem, including one or more processors and memory, configured to perform security or validation services;
an application interface configured to communicate with the application system including to provide said security or validation services to the application system; and
a secure management interface configured to communicate information, including configuration information for the cryptographic processing system for performing said security or validation services, with a service profile system external to the apparatus without passing said configuration information through the application system; where said configuration information includes providing and withdrawing of one or more credentials, with the application interface and the secure management interface being two distinct physical interfaces of the Trusted Platform Module;
wherein the application system is configured to use said security or validation services provided by the Trusted Platform Module.

10. The apparatus of claim 9, wherein the application system includes one or more processing elements and memory configured to execute an operating system.

11. The apparatus of claim 10, wherein the Trusted Platform Module is a module card within an appliance including the application system.

12. The apparatus of claim 9, wherein the apparatus includes a bus; wherein the application interface includes an interface of the Peripheral Component Interface (PCI) family; and wherein the application system and the Trusted Platform Module communicate over the bus.

13. The apparatus of claim 12, wherein the secure management interface includes a network interface configured to communicate with the service profile system for receiving said configuration information; and wherein said configuration interface is not communicated over the bus.

14. The apparatus of claim 9, wherein the application system includes computer hardware and software configured to implement a hypervisor and a plurality of operating systems; and wherein the hypervisor, itself, is configured to use said security or validation services provided by the Trusted Platform Module.

15. The apparatus of claim 14, wherein the hypervisor is configured to use said security or validation services to authenticate one or more of the plurality of operating systems.

16. The apparatus of claim 14, wherein the hypervisor is configured, in addition to said using said security or validation services provided by the Trusted Platform Module for itself, to provide and to interface said security or validation services provided by the Trusted Platform Module for one or more of the plurality of operating systems.

17. A method, comprising:
configuring a Trusted Platform Module based on configuration parameters received via a secure management interface integrated in the Trusted Platform Module of an appliance, with the Trusted Platform Module including using one or more processing elements and memory; and
providing security or validation services over a bus, within the appliance and distinct from the secure management interface, by the Trusted Platform Module to an application system within the appliance, with the application system being implemented using hardware distinct from the Trusted Platform Module; wherein the bus is directly coupled to the Trusted Platform Module with communication over the bus performed using an application interface integrated in Trusted Platform Module and different than the secure management interface;
wherein the configuration parameters of the Trusted Platform Module do not traverse the bus nor are accessible by the application system, and the secure management interface and the application interface are two distinct physical interfaces of the Trusted Platform Module.

18. The method of claim 17, wherein the application system implements a hypervisor, and one or more operating systems operating on a level above the hypervisor; and wherein the hypervisor uses the security or validation services provided by the Trusted Platform Module, including for its own authentication purposes.

19. A networked system, comprising:
a service profile system;
a first platform including: a first cryptographic system configured to perform security or validation services; and a first application system configured to use the first cryptographic system for performing said security or validation services; wherein the first cryptographic system includes: a first cryptographic processing subsystem, including one or more processors and memory, configured to perform security or validation services; a first application interface configured to communicate with the first application system, with said communicating including providing said security or validation services to the first application system; and a first secure management interface configured to communicate information, including first configuration information for the first cryptographic processing system for performing said security or validation services, with a service profile system external to the first platform without passing said configuration information through the first application system nor the first application interface, with the first application interface and the first secure management interface being two distinct physical interfaces of the first cryptographic processing subsystem; and
a second platform including: a second cryptographic system configured to perform said security or validation services; and a second application system configured to use the second cryptographic system for performing said security or validation services; wherein the second cryptographic system includes: a second cryptographic processing subsystem, including one or more processors and memory, configured to perform security or validation services; a second application interface configured to communicate with the second application system, with said communicating including providing said security or validation services to the second application system; and a second secure management interface configured to communicate information, including second configuration information for the second cryptographic processing system for performing said security or validation services, with the service profile system external to the second platform without passing said configuration information through the second application system nor the second application interface, with the second application interface and the second secure management interface being two distinct physical interfaces of the second cryptographic processing subsystem;
wherein the service profile system is configured to provide first configuration information to the first cryptographic system and second configuration information to the second cryptographic system.

20. The networked system of claim 19, wherein each of the first and the second cryptographic systems include a Trusted Platform Module.

21. The networked system of claim 19, wherein the service profile system is configured to: provide third configuration information to the first cryptographic system for providing said security or validation services; and subsequently to disable the first cryptographic system from providing said security or validation services based on said third configuration information, and to provide said third configuration information to the second cryptographic system for providing said security or validation services.

22. The networked system of claim 21, wherein each of the first and the second cryptographic systems include a Trusted Platform Module.

* * * * *